(No Model.) 2 Sheets—Sheet 1.

N. POULSON.
METALLIC GRILL OR GUARD.

No. 404,982. Patented June 11, 1889.

Witnesses:

Inventor (No Model.) N. POULSON. 2 Sheets—Sheet 2.
METALLIC GRILL OR GUARD.
No. 404,982. Patented June 11, 1889.

UNITED STATES PATENT OFFICE.

NIELS POULSON, OF BROOKLYN, NEW YORK.

METALLIC GRILL OR GUARD.

SPECIFICATION forming part of Letters Patent No. 404,982, dated June 11, 1889.

Application filed January 29, 1889. Serial No. 297,941. (No model.)

*To all whom it may concern:*

Be it known that I, NIELS POULSON, of Brooklyn, in the county of Kings, State of New York, have invented certain new and useful Improvements in Metallic Grills or Guards, of which the following is a specification.

This invention relates to such metallic fabrics as are known in the art as "grills" or "guards," and are made of a flat metallic bar or bars so formed or arranged as to constitute a mesh-work.

My improvement consists of a grill composed of crossed flat metallic bars severally formed at predetermined intervals with alternately right-hand and left-hand spirals and intersecting each other across the spirals.

In the annexed drawings the same letters of reference are used in the several figures to indicate identical parts.

Figure 1:
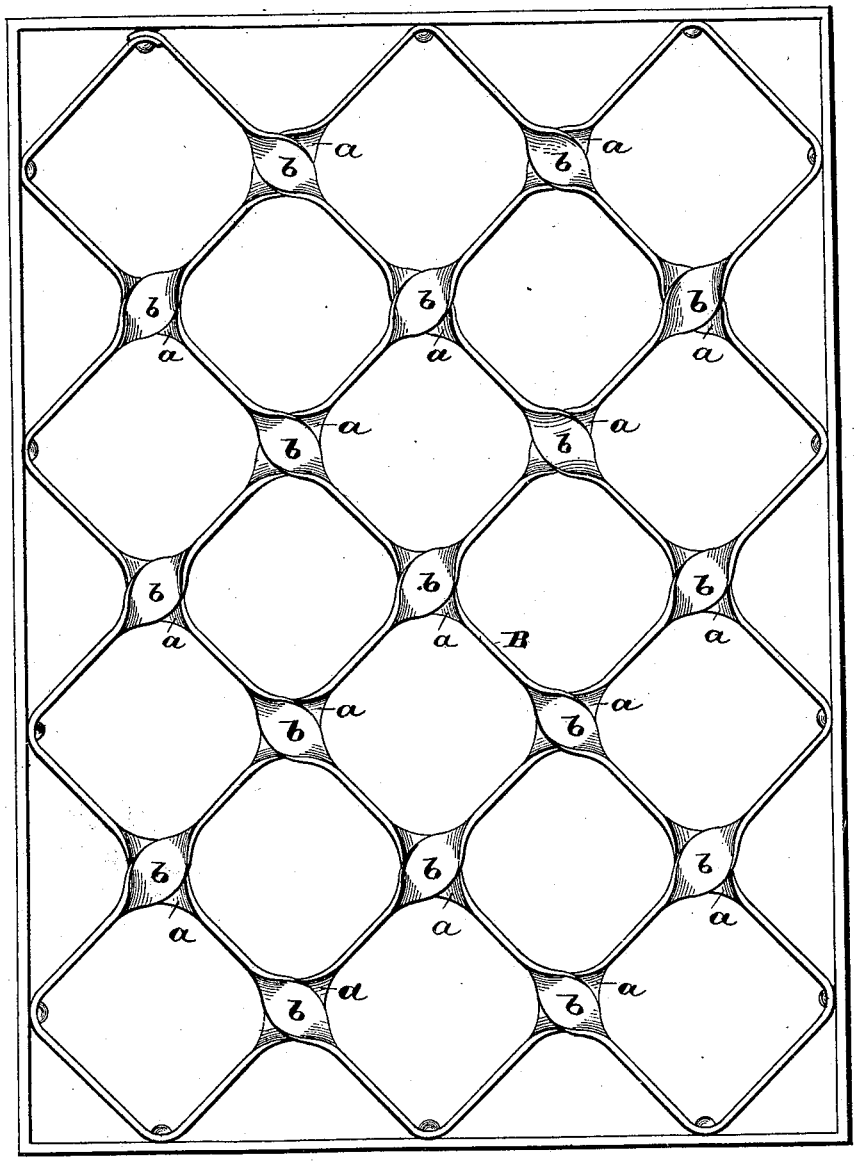
Figure 2:
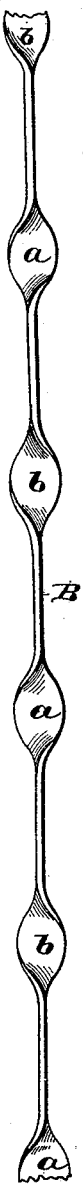
Figure 3:
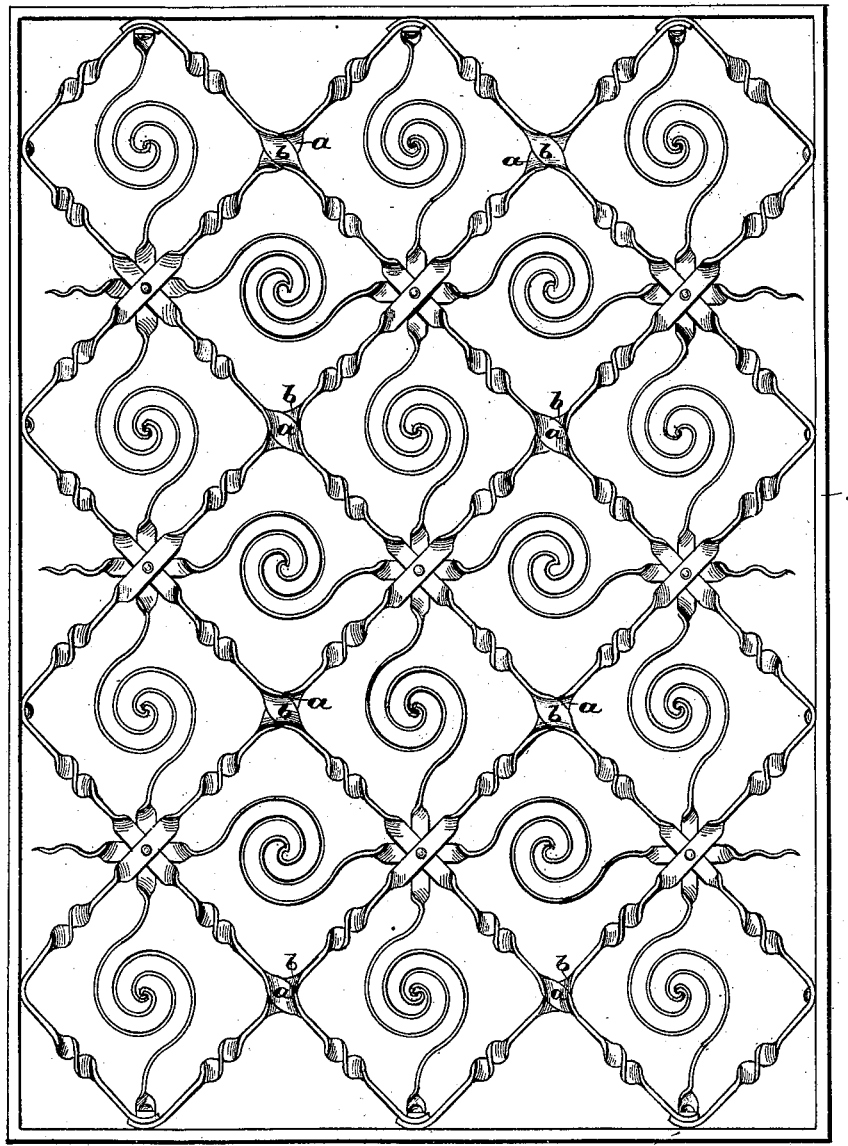

Figure 1 represents an interwoven form of my improved grill. Fig. 2 represents one form of my improved grill-bars. Fig. 3 represents a more ornamental grill embodying my invention.

The grill shown on Fig. 1 is composed of a rectangular frame A and a mesh-work made of a single interwoven flat bar B. This bar is twisted at predetermined intervals, so as to form alternately right-hand spirals *a* and left-hand spirals *b*. The spacing of the spirals is such that when the bar is bent up and interwoven the intersections occur at the spirals, and in every case a right-hand spiral meets a left-hand spiral, so that the two thicknesses of the metal will lie flat against each other. In preparing the grill-bar suitable provision is made for securing it to a frame by omitting the spirals at the proper points, as clearly shown in Fig. 1.

It depends altogether upon the design of the grill at what intervals the right-hand and left-hand spirals of the grill bar or bars occur; but in all cases the succession of the right-hand and left-hand spirals remains the same. Thus Fig. 3 shows a very ornamental grill, the groundwork of which is made according to my invention, where the intersecting spirals occur at varying distances; but it will be observed that here also the direction of intersecting spirals alternates.

In the simple form of my invention, as shown on Fig. 1, where no filling-in is used and riveting at the intersections is dispensed with, it is necessary to interweave the bar or bars; but in case rivets are used at the intersecting spirals or a filling-in is introduced riveted to a groundwork of my invention, as shown in Fig. 3, it is obvious that the bar or bars of this groundwork need not necessarily be interwoven.

I do not confine myself to any particular form or configuration of my improved grill-bars between the alternately right-hand and left-hand spirals thereon, because that configuration depends altogether upon fancy or requirements of filling-in, if any is applied.

I claim as my invention—

1. A grill composed of crossed flat metallic bars severally formed at predetermined intervals, with alternately right-hand and left-hand spirals, and intersecting each other across said spirals, substantially as hereinbefore set forth.

2. A grill composed of interwoven flat metallic bars severally formed at predetermined intervals, with alternately right-hand and left-hand spirals, and intersecting each other across said spirals, substantially as hereinbefore set forth.

In testimony that I claim the foregoing as my invention I have signed my name in the presence of two subscribing witnesses.

NIELS POULSON.

Witnesses:
B. E. J. EILS,
R. B. BROWNE.